United States Patent [19]

Hardwick

[11] 4,428,911

[45] Jan. 31, 1984

[54] METHOD OF PRECIPITATING URANIUM PEROXIDE

[75] Inventor: Thomas J. Hardwick, O'Hara Township, Allegheny County, Pa.

[73] Assignee: Gulf Research & Development Company, Pittsburgh, Pa.

[21] Appl. No.: 423,658

[22] Filed: Sep. 27, 1982

[51] Int. Cl.$^3$ .................... C01G 43/01; C22B 60/02
[52] U.S. Cl. ........................ 423/16; 423/260
[58] Field of Search ............... 423/16, 260, 18

[56] References Cited

U.S. PATENT DOCUMENTS 2,723,181 11/1955 Larson ............................ 423/260
2,770,521 11/1956 Spiegler ........................... 423/16
4,024,215 5/1977 Caropreso et al. ............. 423/260 X

OTHER PUBLICATIONS

Shabbir, et al., U.S. Bureau Mines Report of Investigations, RI 7931, 1974.

Primary Examiner—Deborah L. Kyle
Assistant Examiner—Matthew A. Thexton
Attorney, Agent, or Firm—Deane E. Keith; Forrest D. Stine; Donald L. Rose

[57] ABSTRACT

Uranium peroxide is precipitated from an acidified carbonate strip solution by the addition of hydrogen peroxide and a sufficient quantity of the alkaline carbonate strip solution to maintain the pH at an acid level which is suitable for the precipitation of uranium peroxide.

15 Claims, No Drawings

METHOD OF PRECIPITATING URANIUM PEROXIDE

SUMMARY OF THE INVENTION

The uranium dissolved as uranyl tricarbonate ion in an aqueous alkaline solution is precipitated out as uranium peroxide. The precipitation is carried out by acidifying a portion of the aqueous alkaline solution with excess sulfuric acid to convert the uranyl tricarbonate ion to the uranyl ion and carbon dioxide. This is followed by the addition of hydrogen peroxide to the acidified solution to convert the uranyl ion to uranium perioxide precipitate, producing additional acid. Concurrently, a different portion of the aqueous alkaline uranyl tricarbonate solution is added to the precipitating solution to elevate the pH to an acidic range which is optimum for effective reaction to uranium peroxide and for its precipitation.

DESCRIPTION OF THE INVENTION

Uranium deposits occur world-wide in a wide variety of mineral types, many of which are suitable for the recovery of uranium. Various multi-stage processes and process variants have been suggested, and many have been used, for recovering uranium from the different uranium-bearing minerals. The usability of any particular process depends, in part, on the specific uranium mineral and its content in the ore, the chemical and physical nature of the rock type in which the uranium mineral occurs, the quantity of the various contaminating metals in the ore, and the like.

In an intermediate stage of one procedure for extracting uranium from its ore, an aqueous, alkaline carbonate solution is obtained in which the uranium is solubilized as the uranyl tricarbonate ion, $UO_2(CO_3)_3^{=}$. This solution can be acidified with excess sulfuric acid, to convert the uranyl tricarbonate ion to the uranyl ion, $UO_2^{++}$, and to convert carbonate to carbon dioxide, according to the following equation:

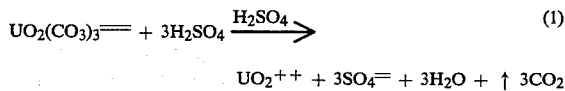

$$UO_2(CO_3)_3^{=} + 3H_2SO_4 \xrightarrow{H_2SO_4} UO_2^{++} + 3SO_4^{=} + 3H_2O + \uparrow 3CO_2 \quad (1)$$

For simplicity, the sodium cation is omitted from this equation. The uranyl ion in the resulting acidic solution is then reacted with hydrogen peroxide to form uranium peroxide, $UO_4 \cdot xH_2O$, which slowly precipitates out of a solution of suitable acidity according to the following equation:

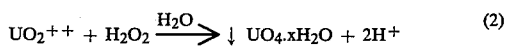

$$UO_2^{++} + H_2O_2 \xrightarrow{H_2O} \downarrow UO_4 \cdot xH_2O + 2H^+ \quad (2)$$

This reaction essentially stops at a pH below about 2.0, and a pH of about 3.5 to about 4.5 is required for full and complete reaction to uranium peroxide. Therefore, in a currently used process, ammonia or ammonium hydroxide is added to the precipitating solution to reduce the excess acidity resulting from equation (2) and elevate the pH in order to promote the peroxidation reaction and to accelerate the precipitation of the uranyl peroxide.

I have discovered a novel process for acidifying an aqueous alkaline uranyl tricarbonate solution and for precipitating the resulting uranyl ion from the acidified solution as uranium peroxide. My process results in a higher recovery of uranium and additionally it results in a purer product of larger particle sizes having good handling characteristics. And all of those benefits are accomplished with lower reagent costs.

These benefits are obtained in my process primarily by the combined effects of (a) substantially reducing the amount of sulfuric acid used for the acidification of the alkaline uranyl tricarbonate solution and (b) completely eliminating ammonia or ammonium hydroxide addition to the precipitating solution for pH control. The reduction in sulfuric acid requirements and the elimination of ammonia per se results in a reduction of the costs for reagents. And the novel process which accomplishes this substantial reduction in reagent costs coincidentally results in other process and product advantages as is described herein.

In my process the alkaline uranyl tricarbonate solution is divided into two portions, a primary feed portion which is acidified as described above, and a secondary feed portion, also called the neutralizer solution by me, which is used in a novel manner and provides the many benefits resulting from my process. This neutralizer solution can range from about 10 to about 45 percent of the overall total aqueous alkaline uranyl tricarbonate solution utilized in my novel uranium recovery process, but more generally it will comprise from about 25 to about 30 percent of the total alkaline feed solution.

In carrying out my process, the primary portion of the uranyl tricarbonate solution is acidified with sufficient excess sulfuric acid to convert the uranyl tricarbonate ion to the uranyl ion according to equation (1) and to reduce the pH of the solution to about 3.5 or lower to cause the evolution of the carbon dioxide moiety in the solution. Desirably the acidified solution is stirred over a period of time to enhance the evolution of substantially all of the carbon dioxide.

Excess hydrogen peroxide is added to the acidified solution to oxidize the uranyl ion to uranium peroxide according to equation (2), which equation additionally shows that this reaction also further acidifies the solution. But since the peroxidation reaction and precipitation of uranium peroxide is slowed or even stopped at too low a pH, this self-defeating aspect of the peroxide addition is counteracted by elevating the pH and maintaining it at a desirable acid level, that is, between about 3.0 and about 4.5, preferably between about 3.5 and about 4.5, and most preferably between about 4.0 and about 4.2. In my process the pH elevation and control is attained in a novel manner. This pH adjustment and control is obtained by the addition of the second portion of the alkaline uranyl tricarbonate feed solution, the neutralizer solution, to the acidic reacting solution.

This neutralizer solution, which in fact only effects a partial neutralization of the acidic reacting solution, also reacts according to equation (1) with the free acid in the solution to produce additional uranyl ion from the uranyl tricarbonate in the neutralizer solution. One of the primary beneficial effects of my process is the utilization of the hydrogen peroxide-generated acid, which is discarded by ammonia neutralization according to current practice. Therefore, the total amount of the acid that is required by my process is only that amount which is required to react with and acidify the primary feed solution, since the acid required for reaction with and acidification of the neutralizer solution is internally generated by the process according to equation (2).

Since the uranium tricarbonate in the neutralizer solution also produces uranyl ion in this acid reaction, the hydrogen peroxide is added in a predetermined excess amount which is based on the total amount of uranium as uranyl ion resulting from the primary feed solution and the subsequently added neutralizer solution. A continuous mode of operation is conveniently carried out by the concurrent addition of the hydrogen peroxide and the neutralizer solution to the peroxidizing solution. The pH of this peroxidizing solution is monitored and the neutralizer solution is fed at a suitable rate to maintain the desired pH in response to the pH monitoring. When an electronic pH reader-controller is used, the neutralizer feed can be automatically varied to maintain a constant pH for extended periods of time.

In initiating my process it has been found to be desirable for improved uranium recovery to acidify the primary feed solution to a low pH, such as about 1.8 to about 3.0. Then after carbon dioxide evolution and hydrogen peroxide addition, the pH is elevated to about 3.5 to about 4.5, within which range the peroxidation reaction and the precipitation is best carried out. Although the neutralizer feed is added and reacts within this higher pH range, the recovery of uranium from the neutralizer solution is not adversely affected by reaction within this pH range. The amount of acid that is used by my process that would otherwise be wasted by ammonia neutralization is the total acid generated in process according to equation (2), plus the excess acid required to lower the primary feed solution to a pH below the pH at which peroxidation and precipitation is carried out. As a result, the acid that is not saved by my process is the acid which is required for the conversion of total carbonate to carbon dioxide.

Generally the feed solution contains metal contaminant, particularly the amphoteric metals such as molybdenum, vanadium, and the like, which must be excluded from the uranium product. The present process is effective in accomplishing this separation because the primary metal contaminants, of which molybdenum is generally present in the greatest abundance, are kept in solution by the hydrogen peroxide. The hydrogen peroxide appears to form some type of loose complex with the metal in a ratio of about three mols of hydrogen peroxide per mol (gram atom) of the metal, and this hydrogen peroxide is not available for peroxidation of the uranyl ion. Therefore, preferred operating conditions include a stoichiometric quantity of hydrogen peroxide for the desired peroxidation reaction plus about three mols of hydrogen peroxide per mol of contaminant metal. At a solution pH of about 4.5 or less, coprecipitation of the metal contaminants is essentially eliminated. Also, at this pH, that is 4.5 or less, the $H_2O_2$ is stabilized against decomposition, and less sodium ion is carried over into the product. Therefore, precipitation of uranium peroxide at a pH between about 4.0 and about 4.5 is particularly preferred.

Another advantage of substantial value which is obtained by my process overall is a reduction in the amount of sulfate ion in the process solution due to the fact that my process overall requires less sulfuric acid. The presence of excess sulfate ion interferes with the reaction and precipitation of the uranium peroxide. Excess sulfate slows the rate of precipitation and causes more uranium to remain in the solution unprecipitated. And the material that does precipitate is of smaller particle size, which causes filtering and drying problems and leads to dusting of the dry product. I have determined that a sulfate concentration within the range of about 25 to about 30 g/l (grams per liter) must not be exceeded to obtain continuous precipitation of uranium peroxide to large particles with a low loss of unprecipitated uranium remaining in the solution.

I have determined that uranium as precipitated uranium peroxide can be substantially completely removed from an alkaline solution containing the uranium as the uranyl tricarbonate ion by my process leaving less than one ppm unrecovered uranium in the solution. The process can be conducted to precipitate relatively large particles which filter very easily. The precipitate can be readily converted to triuranium octoxide with heating. The uranium product obtained by this process is better than 99.9 percent pure as to metal ions.

My process is particularly suitable for the recovery of uranium from the alkaline carbonate strip solution used with the acid leach-solvent extraction process. In this process uranium values are extracted from the ore with sulfuric acid. The uranium is separated from the acid solution by solvent extraction using an organic solvent. The sodium carbonate-containing alkaline strip solution is then used to extract the uranium from the organic solvent. Some sulfate ion is carried over into the strip solution as well as some of the contaminating metals, including molybdenum and vanadium, all of which must be considered in my precipitation procedure.

DESCRIPTION OF PREFERRED EMBODIMENTS

EXAMPLES 1-4

Four experiments were carried out to determine which of four procedures resulted in the greatest precipitation of uranium as determined by analyzing each solution for remaining dissolved uranium after specific periods of time. The starting solution was a sodium carbonate strip solution which analyzed: 20 g/l uranium as $U_3O_8$ (71.1 mM/l); 27.5 g/l sulfate (0.286 M/l); and 14.34 g/l carbonate (0.239 M/l). A small slurry of previously precipitated uranium peroxide was initially introduced into each solution to seed the precipitation. Moderate stirring of each solution took place throughout each of the experiments. In Examples 1 and 2, ammonium hydroxide was used to maintain the desired pH of 3.5 during precipitation. In Example 3 a portion of the sodium carbonate strip solution was used as a neutralizer solution to maintain a pH of 3.5 during precipitation. This neutralizer solution was 29 percent of the total sodium carbonate strip solution of 1,775 ml used in Example 3. In Example 4 less acid was added and no neutralization was required. But the high initial pH would be expected to include a substantial amount of molybdenum in the precipitate. The experimental details and the results are set out in Table I.

TABLE I

|  | Example | | | |
|---|---|---|---|---|
|  | 1 | 2 | 3 | 4 |
| Initial solution, ml | 1800 | 1800 | 1260 | 1800 |
| Sulfuric acid (20N), ml | 43.5 | 40.4 | 32.2 | 32.2 |
| to pH | 3.45 | 4.45 | 2.97 | 5.22 |
| $H_2O_2$ (35%), ml | 12.0 | 12.0 | 12.0 | 12.0 |
| to pH | 2.48 | 2.60 | 2.38 | 3.5 |
| Neutralizer solution, ml | — | — | 515 | — |
| $NH_4OH$ (7N), ml | 30 | 24 | — | — |
| to pH | 3.5 | 3.5 | 3.5 | — |
| $H_2O_2$ (35%), ml | 6.0 | 6.0 | 6.0 | 6.0 |
| final pH | 3.5 | 3.5 | 3.5 | — |
| Dissolved uranium, ppm | | | | |

TABLE I-continued

| | Example | | | |
|---|---|---|---|---|
| | 1 | 2 | 3 | 4 |
| 2 hr | 192 | 427 | 101 | 122 |
| 3 hr | 123 | 252 | 47 | 64 |
| 24 hr | 94 | 199 | 40 | 60 |

EXAMPLES 5–11

A series of experiments were carried out on the precipitation of uranium peroxide similar to the procedure utilized in Example 3. An acidifed aqueous strip solution was reacted with hydrogen peroxide and an additional quantity of aqueous strip solution was added to control solution pH after the addition of the hydrogen peroxide. A diluted strip solution was used in the study analyzing 20 g/l $U_3O_8$, 17.8 g/l total $CO_3^=$; 10.5 g/l $SO_4^=$, 900 ppm Mo, and 15.4 g/l $Na^+$. Precipitation was enhanced by gentle stirring for four hours in each experiment. The precipitate was filtered and washed and a sample was dissolved in nitric acid for metals analysis. The conditions and results of these experiments is set out in Table II.

TABLE II

| | Example | | | | | | |
|---|---|---|---|---|---|---|---|
| | 5 | 6 | 7 | 8 | 9 | 10 | 11 |
| Feed, ml | 100 | 100 | 100 | 100 | 100 | 100 | 100 |
| $H_2SO_4$ added, g | 0.927 | 0.924 | 0.918 | 0.943 | 0.943 | 0.912 | 0.924 |
| pH | 3.02 | 3.00 | 2.97 | 3.01 | 2.89 | 3.04 | 3.02 |
| $H_2O_2$ added (100%), g | 0.335 | 0.419 | 0.524 | 0.461 | 0.461 | 0.461 | 0.461 |
| pH | 1.90 | 2.05 | 2.02 | 2.08 | 2.07 | 2.06 | 2.08 |
| Extra feed added, ml | 28 | 33.2 | 34.17 | 34.1 | 32.2 | 36.8 | 34.85 |
| pH | 3.51 | 3.99 | 4.00 | 4.00 | 3.50 | 5.01 | 4.49 |
| Solution, 4 hours | | | | | | | |
| pH | — | 3.61 | 3.75 | 3.66 | 2.90 | 6.29 | 4.36 |
| $H_2O_2$, g/l | 0.39 | 0.54 | 1.36 | 0.94 | 1.02 | 0.74 | 0.87 |
| $U_3O_8$, ppm | <200 | 2.7 | 0.7 | 1.1 | 44 | 99 | 1.6 |
| Precipitate | | | | | | | |
| $Na/U_3O_8$ | .00038 | .00024 | .00039 | .00043 | .00026 | .00137 | .00050 |
| $Mo/U_3O_8$ | .0023 | .00056 | .00029 | .00027 | .00023 | .00065 | .00041 |
| U purity (metals) | 99.73 | 99.92 | 99.93 | 99.93 | 99.95 | 99.8 | 99.91 |

The data in Table II demonstrates that the process can remove uranium from the solution to less than one part per million residual and produce a product which is greater than 99.9 percent pure as to metal content. The data shows that the best uranium removal is obtained at a final solution pH of between about 4.0 and about 4.5. Further, hydrogen peroxide is required in excess above the one mol for every mol of uranium for the stoichiometric reaction, that is, about three mols for every mol of molybdenum, otherwise considerable uranium remains in solution as shown by Example 5. Also, the coprecipitation of molybdenum is markedly increased at a pH above about 4.5 or with insufficient hydrogen peroxide. A maximum pH of about 4.5 is desirable because hydrogen peroxide degrades at pH's above 4.5 and also because insignificant quantities of sodium are coprecipitated at a pH below 4.5. No detectable sulfate is detected in the precipitate at any pH.

EXAMPLE 12

The continuous production of uranium peroxide was carried out by gravity cascade using five glass tanks, A through E in series, equipped with stirrers. The first two, A and B, had a capacity to overflow of 130 ml, while the last three, C, D and E, had working volumes of about 320 ml each. Tanks A and B were stirred vigorously; Tank C, moderately; and Tanks D and E, gently. The feed solution analyzed: 25.8 g/l (91.87 mM/l) uranium as $U_3O_8$; 1,165 ppm (12.1 mM/l) molybdenum; 352 mM/l $CO_3^=$; 150 mM/l $SO_4^=$; and less than one ppm vanadium.

The run was started by filling the tanks with water and initiating the feed streams. Strip solution was fed into Tank A at a mean flow rate of about 190 ml per hour, and the mean flow rate of 5.66 M sulfuric acid going to Tank A was 10.4 ml per hour. A 2.52 M aqueous solution of hydrogen peroxide was fed into Tank B at a means flow rate of 14.8 ml per hour, which was about 40 percent excess over that amount required to produce the uranium peroxide. Tank C was equipped with a pH electrode unit which reported to a pH recorder-controller. By this means a neutralizer strip feed solution was introduced into Tank C at a variable rate, which averaged about 59 ml per hour to maintain a constant pH of 4.0±0.1 in Tank C. The flow rates provided average residence times in Tanks A and B of about 30 minutes and in Tanks C, D and E, of about one hour. Steady state operation was reached after about eight hours and the experimental operation lasted for an additional fourteen hours.

An effluent slurry was taken hourly from Tank E and allowed to settle, and the effluent liquid and the filtered and dried yellow solid were separately analyzed. The supernatent fluid contained an average of about 95 ppm uranium; 1,156 ppm molybdenum; and 48 mM/l of hydrogen peroxide. The dried product showed an average weight ratio of both sodium and molybdenum to $U_3O_8$ of about 0.0002.

The dried filter cake readily broke up into fine, easily handled particles. When submitted to micro sieving, it was found that 6.3 percent was retained on a 40 micron sieve, 29.4 percent was retained on a 20 micron sieve, and 45.2 percent was retained on a 10 micron sieve, with 19.1 percent being less than 10 microns in particle size. The precipitate was converted to uranium peroxide dihydrate upon heating it to 150° C., which was also a pourable, dry powder. This dihydrate was converted to $U_3O_8$ by heating it to 625° C. with a total water loss of 26.9 percent which corresponded to a composition of $UO_4(H_2O)_{4.6}$ for the air-dried precipitate.

Although this experiment demonstrated that the process could effectively be carried out on a continuous basis, it is apparent that the unprecipitated uranium in the supernatant liquid is much too high. Subsequent analysis disclosed that the system did not provide sufficient opportunity for the precipitation of the uranium. It was determined that if the three tanks (C, D and E) having one hour per tank average residence times were replaced with five tanks having an average residence time of about ninety minutes per tank, the uranium content of the supernatent liquid would be less than one ppm.

A further experimental study was directed to a determination of the criticality of the sulfate concentration on the operation of the process. It was found that sulfate concentration was critical from two aspects. First, a maximum sulfate concentration in the precipitation medium of about 30 g/l, preferably 25 g/l, is necessary to prevent undesirable losses (greater than one ppm) of uranium in the filtrate. Second, product particle size is adversely affected by sulfate concentration. Above 50 g/l sulfate, the production of fines is the general rule, while below about 35 g/l, the larger particles are produced. If the initial sulfate concentration is too high, it can be readily reduced by aqueous dilution of the feed solution.

It is self-evident that the initial feed solution, that is the carbonate strip solution which is directly acidified with sulfuric acid, plus the neutralizer solution, form the overall or composite feed. Therefore, it is this composite feed solution which determines how much carbonate must be eliminated as carbon dioxide; how much molybdenum, vanadium, and other contaminating metals are introduced to the process; and how much sulfate ion is carried over from the organic solvent present in the preceding stage.

This process can be used for the recovery of uranium as uranium peroxide from any aqueous solution in which it is present as the uranyl ion, and it is particularly useful as a part of the overall acid leach-solvent extraction process for the recovery of uranium from its ores when sodium carbonate is used to strip the uranium from the organic solvent. The uranium can be precipitated from the acidified carbonate strip solution by my process in minute amounts too small to be economically recovered up to the maximum solubility of uranium in the acidified strip solution. In general the amount of uranium in the carbonate strip solution as the uranyl tricarbonate ion but determined as triuranium octoxide is between about 5 and about 40 g/l. However, if too much sulfate ion is present, it may be desirable to dilute the recovery solution to obtain maximum precipitation of the uranium peroxide as discussed above.

It is to be understood that the above disclosure is by way of specific example and that numerous modifications and variations are available to those of ordinary skill in the art without departing from the true spirit and scope of the invention.

What is claimed is:

1. A method for precipitating uranium peroxide, $UO_4 \cdot XH_2O$, from an aqueous acidic solution containing uranyl ion, $UO_2^=$, and sulfate ion which comprises adding to said aqueous acidic solution (1) hydrogen peroxide in sufficient quantity to precipitate uranium peroxide and (2) a sufficient quantity of an aqueous alkaline neutralizer solution comprising uranyl tricarbonate ion, $UO_2(CO_3)_3^{==}$, and carbonate ion to form a precipitation solution having an acid pH which is suitable for the precipitation of the uranium as uranium peroxide.

2. A method for precipitating uranium peroxide from an aqueous acidic solution containing uranyl ion in accordance with claim 1 in which said acid pH of the said precipitation solution is between about 3.0 and about 4.5.

3. A method for precipitating uranium peroxide from an aqueous acidic solution containing uranyl ion in accordance with claim 1 in which said acid pH of the said precipitation solution is between about 3.5 and and 4.5.

4. A method for precipitating uranium peroxide from an aqueous acidic solution containing uranyl ion in accordance with claim 1 in which the sulfate concentration of said precipitation solution is a maximum of about 40 g per liter.

5. A method for precipitating uranium peroxide from an aqueous acidic solution containing uranyl ion in accordance with claim 1 in which the sulfate concentration of said precipitation solution is a maximum of about 30 g per liter.

6. A method for precipitating uranium peroxide from an aqueous acidic solution containing uranyl ion in accordance with claim 1 in which at least about one mol of hydrogen peroxide is added for every mol of uranyl ion present in said precipitation solution and at least about three mols of hydrogen peroxide are added for every mol of amphoteric metals present in said precipitation solution.

7. A method for precipitating uranium peroxide from an aqueous acidic solution containing uranyl ion in accordance with claim 6 in which molybdenum is the predominant amphoteric metal.

8. A method for precipitating uranium peroxide from an aqueous acidic solution containing uranyl ion in accordance with claim 1 in which the concentration of uranium, determined as triuranium octoxide, which is present in the said precipitation solution is between about 5 and about 40 g/l.

9. A method for precipitating uranium peroxide from an aqueous acidic solution containing uranyl ion in accordance with claim 1 in which the concentration of uranium which is present in the said aqueous acid solution and in the said neutralizer solution is about the same.

10. A continuous process for the precipitation of uranium values from an aqueous basic solution containing the uranium as the uranyl tricarbonate ion, $UO_2(CO_3)_3^{==}$, which comprises the steps:
    (a) adding sulfuric acid to the said aqueous basic solution to produce an acidic pH suitable to convert the uranyl tricarbonate complex to the uranyl ion, $UO_2^=$, and carbon dioxide;
    (b) introducing sufficient hydrogen peroxide to the acidified solution to precipitate the uranium as uranium peroxide ($UO_4 \cdot XH_2O$), and
    (c) introducing a sufficient additional quantity of the aqueous basic solution to maintain a pH of between about 3.0 and about 4.5 in the solution while the uranium peroxide is precipitating.

11. A continuous process for the precipitation of uranium values from an aqueous basic solution in accordance with claim 10 in which the pH of said solution is maintained between about 3.5 and about 4.5 during the precipitation.

12. A continuous process for the precipitation of uranium values from an aqueous basic solution in accordance with claim 10 in which at least about one mol of hydrogen peroxide is added to the solution for every mol of uranium which is present in the solution at the initiation of the precipitation.

13. A continuous process for the precipitation of uranium values from an aqueous basic solution in accordance with claim 12 in which the additional amount of at least about three mols of hydrogen peroxide is added for every mol of amphoteric metal which is present in the solution at the initiation of the precipitation.

14. A continuous process for the precipitation of uranium values from an aqueous basic solution in accordance with claim 12 in which molybdenum is the predominant amphoteric metal.

15. A continuous process for the precipitation of uranium values from an aqueous basic solution in accordance with claim 10 in which amount of sulfate ion present in the solution during precipitation is less than about 30 g/l.

* * * * *